United States Patent [19]
Hawes

[11] 3,762,360
[45] Oct. 2, 1973

[54] VEHICLE SIGN ASSEMBLY

[75] Inventor: Edward L. Hawes, Hazel Park, Mich.

[73] Assignee: Hawes Industries, Inc., Hazel Park, Mich.

[22] Filed: Nov. 22, 1971

[21] Appl. No.: 200,778

Related U.S. Application Data

[63] Continuation-in-part of Ser. No. 107,721, Jan. 19, 1971, Pat. No. 3,672,323, and a continuation-in-part of Ser. No. 79,727, Oct. 12, 1970.

[52] U.S. Cl. ............ 116/28 R, 40/129 C, 116/173, 248/181, 287/21, 287/87
[51] Int. Cl. .................................................. B60q
[58] Field of Search .................. 116/63, 28 R, 63 P; 40/125 N, 129 C; 94/1.5; 287/87, 21, 88, 89, DIG. 10; 248/181

[56] References Cited
UNITED STATES PATENTS

| | | | |
|---|---|---|---|
| 470,668 | 3/1892 | Fisher | 287/21 |
| 2,345,299 | 3/1944 | Shipley | 287/87 |
| 2,553,963 | 5/1951 | Dzus | 116/28 R |
| 2,861,501 | 11/1958 | Strelakos | 287/21 X |
| 2,869,504 | 1/1959 | Andrews et al. | 116/63 P |
| 2,887,983 | 5/1959 | Budd | 116/63 P |
| 2,991,699 | 7/1961 | Murray, Sr. | 116/63 P |
| 2,993,465 | 7/1961 | Ginsley et al. | 116/63 P |
| 3,589,328 | 6/1971 | Kiniry et al. | 116/63 P |
| 3,672,323 | 6/1972 | Hawes | 116/28 R |

Primary Examiner—Louis J. Capozi
Attorney—Robert C. Hauke et al.

[57] ABSTRACT

A sign assembly for use on a vehicle having at least one generally vertically adjustable window for mounting a clamp portion of the sign thereto. The clamp portion supports a standard which carries a sign generally upward and above the roof of the vehicle so that the sign is visible from all directions. In a first embodiment the sign assembly includes a reflectorized triangular sign which is collapsible for storage. In a second embodiment the sign has a flag portion to be used to carry a message such as to indicate that the vehicle is for sale or is in distress. The flag is mounted to a frame section which is rotatable in order to attract attention. The sign frame section is adapted to easily mount and dismount different flag portions to the assembly and at the same time to hold the flag portions taut and securely mounted. Universal type adjustment means are provided in the standard of both embodiments to elevationally position the signs and also to adjust and lock the signs in any axially rotated position so that the signs will be properly positioned above the roof of the vehicle regardless of the configuration of the window edge and of the vehicle roof.

8 Claims, 9 Drawing Figures

PATENTED OCT 2 1973

INVENTOR
EDWARD L. HAWES
BY
Hauke Gifford & Patalidis
Attorneys

PATENTED OCT 2 1973 3,762,360

INVENTOR
EDWARD L. HAWES
BY
Hauke Gifford & Patalidis
Attorneys

VEHICLE SIGN ASSEMBLY

RELATIONSHIP TO OTHER PATENT APPLICATIONS

The present application is a continuation-in-part of application Ser. No. 107,721 filed Jan. 19, 1971 now U.S. Pat. No. 3,672,323 and Ser. No. 79,727 filed Oct. 12, 1970.

BACKGROUND OF THE INVENTION

1. Field of the Invention

The present invention relates to a sign assembly and, more particularly, to such an assembly mountable to the window of a vehicle and including means for adjusting the elevational position of the sign to mount the sign in an upright position above the roof of the vehicle regardless of the manner in which the window edge is formed.

2. Description of the Prior Art

Signs for vehicles have generally been of the type which remain in a fixed configuration relative to the vehicle and which are designed to alert approaching traffic that the vehicle is disabled, that it is involved in some ceremonious affair, or that it should be noted for some other reason.

The most commonly used method of providing a warning of a disabled vehicle has been the use of flares. Flares require matches and can only be used once so that they are not entirely satisfactory.

Recently, and especially with the increase of high speed expressway driving, a definite need for a disabled vehicle warning sign assembly has become apparent. Such a sign assembly should be readily visible and capable of being conveniently stored between use and be readily assembled when the need arises.

Although signs of this type which mount to the window of a vehicle have been provided in the past, there are relatively few signs which will clamp to the window of the vehicle and which are provided with adjustment means to properly position the sign above the roof of the vehicle regardless of the configuration of the window edge and of the vehicle roof. My co-pending applications disclose signs mountable to the window edge of a vehicle, but like other signs of this type in the past these signs are not adaptable to the newer automobiles where curved side windows are used. A clamp designed for use with vehicle windows which are flat will cause the signs to extend obliquely from the vehicle if used with a curved window. Bending or twisting of the standard to attain proper adjustment weakens and eventually causes the standard to break.

SUMMARY OF THE INVENTION

In the first embodiment of the present invention a sign of a generally triangular configuration is provided. A supporting member has a clip adapted to be mounted to the window edge of a vehicle and the sign is adjustable to be mounted over the roof of the vehicle where it is clearly visible.

In the second embodiment a flag is provided which can be readily attached to and detached from a standard. The flag is rotatable with respect to the standard so that it will rotate in the wind to thereby attract attention. Means are provided to mount the sign to window edge of a vehicle so that the flag is mounted above the roof of the vehicle.

In each embodiment of the invention adjustment means are provided to permit the sign to be attached to the vehicle window regardless of the configuration of the window and to extend above the vehicle roof at the proper angle so that it is clearly visible. Thus the signs of the present invention can be employed with vehicles having curved windows.

DESCRIPTION OF THE DRAWINGS

A better understanding of the present invention will be achieved upon reference to the following description of several preferred embodiments thereof. The description makes reference to the following drawings in which like reference characters refer to like parts throughout the several views, and in which.

DESCRIPTION OF THE PREFERRED EMBODIMENTS

Figure 1:
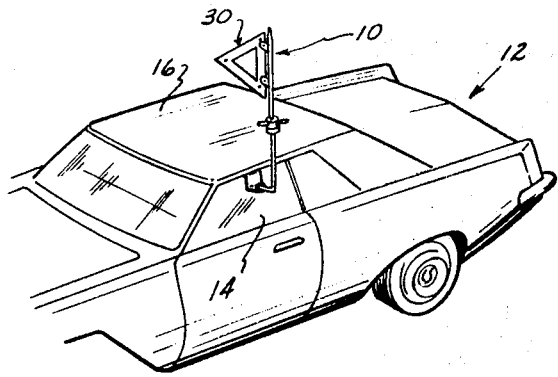
FIG. 1 is a perspective view illustrating a first embodiment of a sign member of the present invention in use.

The invention is illustrated in FIG. 1 as comprising a sign assembly 10 extending generally vertically upwardly from a vehicle 12, and more particularly from a generally vertically adjustable window 14 to which it is mounted. In each of the embodiments to be described the various sign assemblies are mounted to the edge of the window 14 to extend generally upwardly and to be positioned above or over the roof 16 of the vehicle 12.

Figure 2:
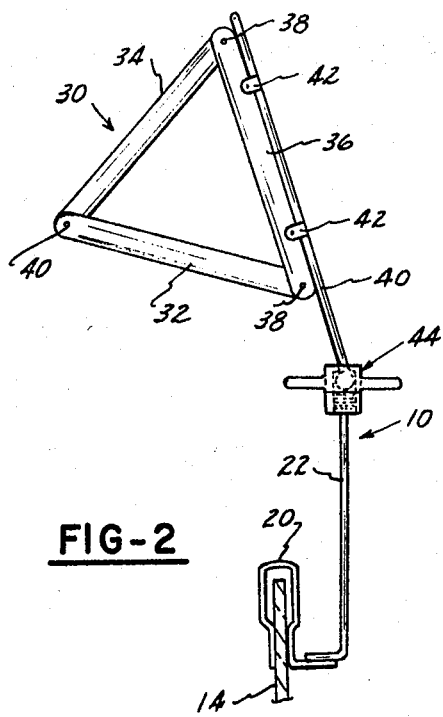
FIG. 2 is an enlarged perspective view of the sign member illustrated in FIG. 1 and illustrating the manner of attachment to a vehicle.
Figure 3:
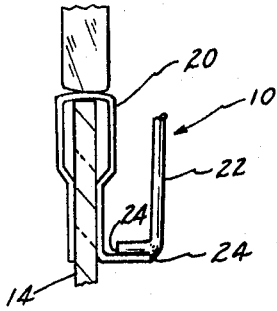
FIG. 3 is an enlarged fragmentary partial cross sectional view of a vehicle frame and window in position to securely fasten the sign of FIGS. 1 and 2 in position.
Figure 5:
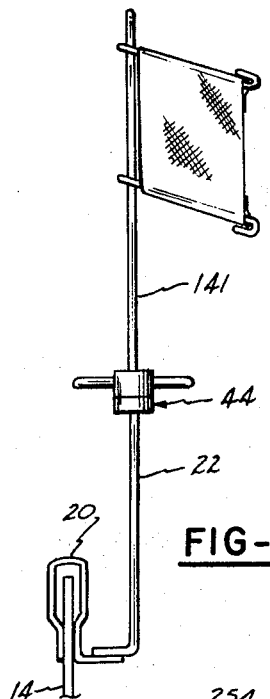
FIG. 5 is a fragmentary perspective view of the embodiment illustrated in FIG. 3.
Figure 7:
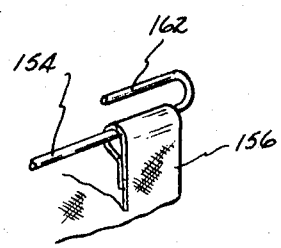
FIG. 7 is an enlarged fragmentary view of a portion of the sign shown in FIG. 3.

FIG. 2 is an enlarged view of the sign assembly 10 shown in FIG. 1. As seen in FIGS. 2 and 3, the sign assembly 10 is attached to the window glass 14 by clamp 20 to which is attached a lower standard 22. The lower standard 22 is secured to the clip or clamp 20 by spot welds 24 (FIG. 3) or by any other convenient means. The clamp 20 is made from a generally resilient material and is formed to have a generally U-shaped appearance in section. The clamp 20 may be coated with any generally known soft pliable rubber-like elastomer coating to preclude damage to the window 14 of the vehicle 12 to which the clamp 20 fastens.

The first preferred embodiment of the invention as illustrated in FIGS. 1–3 comprises the standardized triangular vehicle warning sign 30. By positioning the triangular sign 30 above the roof 16 of the automobile 12, it is sufficiently visible to give ample warning to traffic approaching the disabled vehicle from either direction. The sign member 30, as can best be seen in FIG. 2, is preferably of an equilateral triangular configuration having sides 32 and 34 joined to a base 36 by means of pivotal connections 38 and to each other by a snap connection generally indicated at 40. The ends of the sides 32 and 34 are disposed on opposite sides of the base 36 so that when the snap connection is disconnected, the sides 32 and 34 will pivot downwardly to a position adjacent to and on opposite sides of the base 36. It is apparent that if desired the snap connection 40 could be provided at the intersection of one of the sides 32 or 34 with the base 36, with the pivotal connections being provided at the other intersections. Even with this arrangement, the sides 32 and 34 would still fold down on either side of the base 36.

The snap connection 40 is of a conventional construction and is of the type commonly used to attach one piece of fabric to another such as in clothing or the like and preferably comprises a female member (not shown) carried at the upper end of the side 34 and a male member (not shown) carried at the upper end of the side 32 and adapted to be received by the female member to thereby connect the ends of the sides 32 and 34 one to the other. At least one face of the sides 32 and 34 and the base 36, and preferably both faces, is provided with alternate strips of reflecting material, one for night time, the other for day time, to provide the necessary reflection and visibility to attract the attention of motorists.

Figure 9:
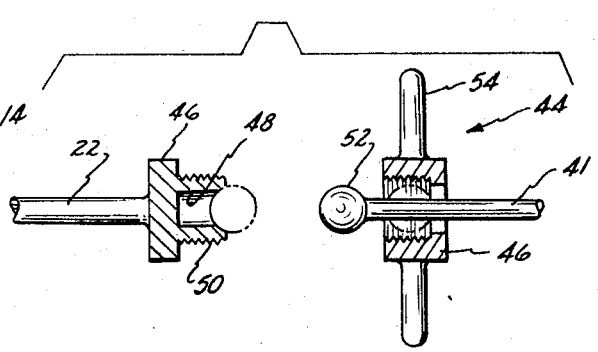
FIG. 9 is a cross-sectional view of the adjustable joint employed in the standard used to support the sign in each embodiment of the invention.

As can be seen in FIG. 2, the sign 30 includes an upper standard 41 mounted to the base 36 by clips 42 and joined to the lower standard 22 through an adjustable joint 44. The joint 44, as shown in cross section in FIG. 9, comprises a socket member 46 welded to the lower standard 22. The socket member 46 has a bore 48 and an outside thread 50. The mating end of the upper standard 41 carries a ball 52. The upper standard 41 carries wing nut 54 behind the ball 52. The wing nut 54 has internal threads 56 to be received by the external threads 56 on the socket member 46. Thus, when the ball 52 is fitted into the socket bore 48, a universally adjustable joint is formed which can be rotated into any position to universally mount the upper standard 41 relative to the lower standard 22 and then locked in position by means of the wing nut 54 threaded over the socket member 46.

In the second embodiment of the invention illustrated in FIGS. 4–7, an upper standard 141 similar to standard 41 and having the lower end secured to adjustable joint member 44 has attached at its uppermost end a rigid cylindrical extension tube 142. The upper end of the upper standard 141 extends part-way into the opening of the cylindrical extension tube 142 as can best be seen in FIG. 6 in order to be securely fastened thereto. Fastening of the tube 142 to the upper standard 141 can be accomplished by a weldbead 144, or any other known method such as crimping or the like. The extension tube 142 extends above the upper standard 141 somewhat to form a chamber 144 for a portion 146 of a frame section 148 to be engaged therein. Although it is convenient to use the extension tube 142 to form the chamber, other means are available, such as the upper standard 141 itself being hollow at its uppermost end thereby precluding the necessity of adding an additional element.

On the upper standard 141, intermediate the adjusting means 44 and the extension tube 142, is an anti-friction bearing sleeve 150 securely fastened in a location along the upper standard 141 by any convenient means. The anti-friction bearing sleeve 150 may, if desired, be molded directly to the upper standard 141. The bearing sleeve 150 is generally composed of a non-corrosive material having low friction properties.

Figure 4:
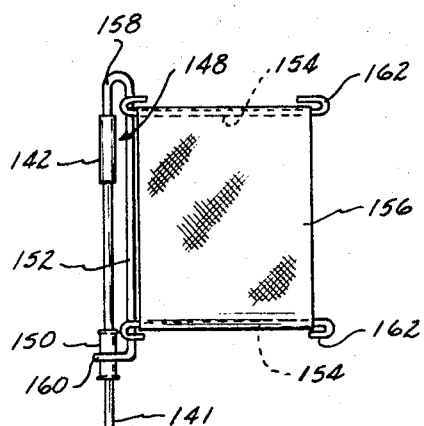
FIG. 4 is an elevational view of another preferred embodiment of the invention.
Figure 6:
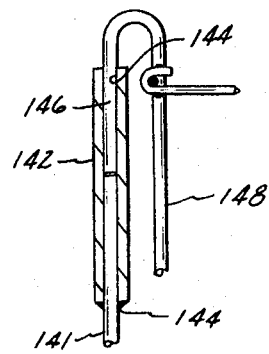
FIG. 6 is an enlarged fragmentary partial cross sectional view of a portion of the sign frame shown in FIGS. 4 and 5.

As can best be seen in FIG. 4, the frame section 148 generally comprises an elongated longitudinally extending frame member 152, two radially extending arms 154 and a planar indicia bearing flag member 156. The frame member 152 is of a relatively rigid material and has its uppermost end turned back upon itself to form a substantially U-shaped hook 158. The base of the hook 158 is generally curved. The bottommost end of the frame member 152 has a ring portion 160 which is generally annular in shape and which is in a plane substantially perpendicular to the longitudinal length of the frame member 152. The ring portion 160 has its imaginary centermost point substantially on an imaginary line parallel to the longitudinal length of the frame member 152 extending from the U-shaped hook 158. The ring portion 160 is formed at a predetermined distance from the end of hook portion 158 in order to encircle the bearing sleeve 150 when the end of the hook portion 158 of the frame member 152 is fully engaged in the chamber 144 formed by the cylindrical extension tube 142 as shown in FIGS. 4 and 6.

As illustrated, the end of each arm 154 opposite the frame member 152 has a bent portion 162 which is turned back upon the longitudinal length of each arm 154 to form a portion parallel to the arm 154.

The flag member 156 is preferably constructed of fabric or plastic type material having information included thereon and is engageable with arms 154. Although other shapes are possible, the flag member is shown to be of rectangular shape and has at its uppermost and bottommost ends hemmed portions. The turned back portion 162 of each arm is of sufficient length to prevent disengagement of the flag member 156 from the arms 154 without compound relative movement of these members. The loop formed by the hemmed portion is large enough to have each arm 154 and the turned back portion 162 of each arm 154 pass therethrough so that with proper manipulation of these members the flag member 156 can be readily removed and replaced. This ease of interchangeability promotes the use of the sign assembly for numerous occasions and for it to display sundry information.

In order to mount any flag member 156 to the frame member 152, each parallel extending arm 154 is flexed towards the other and the respective hemmed portions are passed over each arm 154 and its turned back portion 162. The flag member 156 is slid along the arms 154 until further passage is restricted by frame member 152. At this point, the hemmed portions will not be fully engaged with the turned back portion 162 of each arm at the end of the flag member 156 farthermost from frame member 152. In order for the flag member 156 to become engaged with the turned back portions 162 of arms 154, as illustrated in FIG. 4, the flag member 156, being of suitable fabric, is bent or wrinkled inwardly toward the frame 152 in order for the hemmed portions to pass over each turned back portion 162 and then for the hemmed portions to be smoothed out and to be disposed between each arm 154 and its turned back portion 162 and to be thereby fully engaged with the arms 154.

The resilient arms 154 are generally biased away from each other. After a flag member 156 is fully engaged, the biased arms 154 return to their normal positions and thereby stretch out the fabric-like material of the flag member 156 and hold it taut.

The portion of the sign assembly below the universal joint 44 is substantially identical to the corresponding portions of the sign assembly 10 of FIGS. 1-3 and therefore comprises a lower standard 22 having its upper end secured to the universal joint 44 and its lower end secured to a clip 22 adapted for mounting to a vehicle window 14.

The frame member 152, the arms 154 and the flag 156 are easily rotatable about the upper standard 141 because of the method of mounting of the hook portion 146 of the frame member 152 in the chamber 144 and the freedom of the ring portion 160 to circle about the bearing sleeve 150 mounted to the upper standard 141. The hooked portion 146 ideally has minimum contact with the inner walls of the pivot chamber formed by the cylindrical extension tube 142 and the uppermost end of the upper standard 141. In addition, the inside of the ring portion 150 has minimal contact with bearing sleeve 150 and between the two points of contact there is little resistance to prevent rotation. The result is a sign assembly which can be mounted to the vehicle window 14 to extend above the roof of the vehicle 12 regardless of the configuration of the window or of the vehicle roof and which will when in position provide a rotating flag member 156 to attract attention.

It is often desirable, however, or even necessary to have the banner remain in a stationary position regardless of the direction of the wind. Such would occur, for example, when the present invention is utilized as an emergency sign on a disabled vehicle, or when the present invention is used as an advertising sign, and it is desirable for the banner to be displayed towards a certain direction such as towards a road. In accordance with this requirement, a preferred modification of the embodiment shown in FIGS. 4-7 may be desirable.

Figure 8:
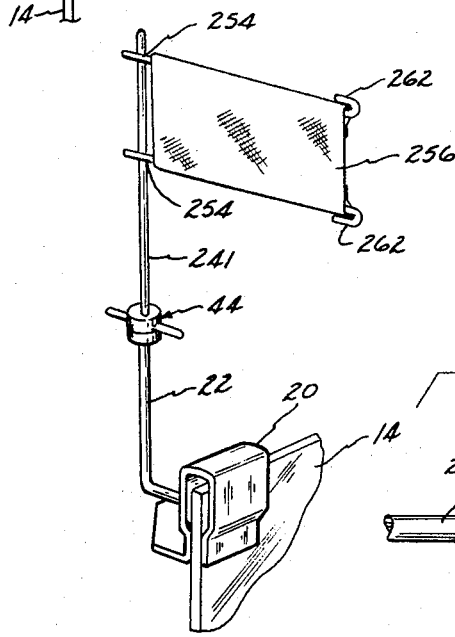
FIG. 8 is an elevational view of a preferred modification of the embodiment of the invention illustrated in FIGS. 4–7.

Referring now to FIG. 8, a preferred modification is therein illustrated as comprising an upper standard 241 having welded or otherwise fastened securely thereto a pair of parallel extending reslient arms 254. The arms 254 are formed with turned back portions 262 to receive and retain a flag member 256 substantially in the manner described above with respect to the embodiment of FIGS. 4-7. Unlike that embodiment, however, the flag member 256 is fixed with respect to the standard 241 and will not rotate.

The two piece construnction of the standard in each embodiment of the invention permits the length to be reduced sufficiently on disassembly of the sign member to enable the sign assembly to be stored in a smaller area than would be possible if the standard were of one piece. It is clear, however, that where there is sufficient area and to reduce costs the standard could if desired be made in one piece.

It is apparent that although several preferred embodiments of the present invention have been described in each embodiment the sign member is adapted to be attached to the upper edge of a window of the vehicle and to extend upwardly to a position above the roof of the vehicle. The universal member insures that the axial and rotational positions between an upper and lower standard can be adjusted to accommodate various configurations of vehicle windows and vehicle roofs.

It is also apparent that other changes and modifications can be made without departing from the spirit or the scope of the present invention.

I claim:

1. A sign assembly comprising
    a sign member and means for supporting said sign member in an upright position above the roof of a vehicle, said supporting means comprising a standard having one end attached to said sign member;
    a clip carried at the opposite end of said standard for attaching said standard to the upper edge of a window of the vehicle; and
    means intermediate the ends of said standard to provide universal adjustment between said clip and said sign member whereby said sign assembly can be utilized with vehicles having various configurations of windows and roofs.

2. The sign assembly as defined in claim 1 and in which said last mentioned means are disconnectable so that said standard can be disconnected to form two pieces for purposes of storage.

3. The sign assembly as defined in claim 1 and in which said sign member is triangular and is provided with light reflective material on at least one face.

4. The sign assembly as defined in claim 1 and including means mounting said sign member to said standard to provide rotation of said sign member about said standard.

5. The sign assembly as defined in claim 1 and in which said last mentioned means comprises said standard having an upper section and a lower section, a ball member and a socket carried by the lower end of said upper section and the upper end of said lower section, and means carried by said standard for locking said ball in said socket at a selected rotated position.

6. A sign assembly comprising
    a substantially triangular sign member having a base and a pair of side members;
    light reflective material carried on at least one surface of said base and sides;
    means securing said sides together and to said base to permit disconnection of at least one joint and pivoting of said sides and said base to a compact side by side position;
    a standard having a clip at one end for mounting said sign assembly to extend from the upper edge of a vehicle window and having its opposite end fastened to said sign member; and
    means carried by said standard to permit universal adjustment between said clip and said sign member whereby regardless of the configuration of the upper edge of the vehicle window the sign member can be positioned above the roof of the vehicle to increase its visibility.

7. The sign assembly as defined in claim 6 and in which said last mentioned means are disconnectable so that said standard can be disconnected to form two pieces for purposes of storage.

8. The sign assembly as defined in claim 6 and in which said last mentioned means comprises a ball and socket joint.

* * * * *